US009659389B2

(12) United States Patent
Ye

(10) Patent No.: US 9,659,389 B2
(45) Date of Patent: May 23, 2017

(54) FAST SCATTER ESTIMATION IN PET RECONSTRUCTION

(71) Applicant: KONINKLIJKE PHILIPS N.V., Eindhoven (NL)

(72) Inventor: Jinghan Ye, Cupertino, CA (US)

(73) Assignee: KONINKLIJE PHILIPS N.V., Eindhoven (NL)

( * ) Notice: Subject to any disclaimer, the term of this patent is extended or adjusted under 35 U.S.C. 154(b) by 300 days.

(21) Appl. No.: 14/396,464

(22) PCT Filed: May 15, 2013

(86) PCT No.: PCT/IB2013/053965
§ 371 (c)(1),
(2) Date: Oct. 23, 2014

(87) PCT Pub. No.: WO2013/175352
PCT Pub. Date: Nov. 28, 2013

(65) Prior Publication Data
US 2015/0093004 A1    Apr. 2, 2015

Related U.S. Application Data

(60) Provisional application No. 61/649,825, filed on May 21, 2012, provisional application No. 61/658,049, filed on Jun. 11, 2012.

(51) Int. Cl.
*G06K 9/00* (2006.01)
*G06T 11/00* (2006.01)

(52) U.S. Cl.
CPC ................. *G06T 11/005* (2013.01)

(58) Field of Classification Search
None
See application file for complete search history.

(56) References Cited

U.S. PATENT DOCUMENTS

| 6,256,367 | B1 | 7/2001 | Vartanian |
| 7,397,035 | B2 | 7/2008 | Watson |
| 7,902,511 | B2 | 3/2011 | Thielemans et al. |
| 2007/0200066 | A1* | 8/2007 | Bai ........................ G01T 1/1642 250/369 |

(Continued)

OTHER PUBLICATIONS

Accorsi, R., et al.; Optimization of a fully 3D single scatter simulation algorithm for 3D PET; 2004; Phys. Med. Biol.; 49:2577-2598.

(Continued)

*Primary Examiner* — Jason Heidemann

(57) ABSTRACT

An image processing apparatus includes a scatter simulation processor which processes measured sinograms generated from imaging data acquired for an imaging subject by an imaging apparatus to produce a scatter sinogram that represents a shape of scatter contribution. A scatter scaling processor utilizes a Monte Carlo simulation to determine a scatter fraction and scales the scatter sinogram to generate a scaled scatter sinogram that matches the scatter contribution in the measured sinogram. A reconstruction processor reconstructs the imaging data into an image representation using the scaled scatter sinogram for scatter correction.

23 Claims, 4 Drawing Sheets

(56) References Cited

U.S. PATENT DOCUMENTS

| | | |
|---|---|---|
| 2009/0154641 A1* | 6/2009 | Thielemans .......... G01T 1/1647 378/21 |
| 2010/0078568 A1 | 4/2010 | Byars et al. |
| 2010/0086101 A1* | 4/2010 | Thielemans .......... G06T 11/005 378/21 |
| 2012/0049053 A1 | 3/2012 | Olivier et al. |
| 2015/0098640 A1* | 4/2015 | Berker .................. A61B 6/037 382/131 |

OTHER PUBLICATIONS

Holdsworth, C. H., et al.; Evaluation of a Monte Carlo Scatter Correction in Clinical 3D PET; 2003; IEEE Symposium on Nuclear Science and Medical Imaging; 2540-2544.

Kim, K. S., et al.; Ultra-Fast Hybrid CPU-GPU Monte Carlo Simulation for Scatter Correction in 3D PETs; 2011; IEEE Nuclear Science Symposium Conf. Record; 2749-2752.

Polycarpou, I., et al.; Comparative evaluation of scatter correction in 3D PET using different scatter-level approximations; 2011; Ann. Nucl. Med.; 25:643-649.

Reader, A. J., et al.; Attenuation and Scatter Correction of List-Mode Data Driven Iterative and Analytic Image Reconstruction Algorithms for Rotating 3D Pet Systems; 1999; IEEE Trans. on Nuclear Science; 46(6)2218-2226.

* cited by examiner

FAST SCATTER ESTIMATION IN PET RECONSTRUCTION

CROSS REFERENCE TO RELATED APPLICATIONS

This application is a national filing of PCT application Serial No. PCT/IB2013/053965, filed May 15, 2013, published as WO 2013/175352 A1 on Nov. 28, 2013, which claims the benefit of U.S. provisional application Ser. No. 61/649,825 filed May 21, 2012 and U.S. provisional application Ser. No. 61/658,049 filed Jun. 11, 2012, both of which are incorporated herein by reference.

The present application relates to the diagnostic imaging arts. It finds particular application in accelerating the estimation of scatter in a nuclear medicine scanner, and will be described with particular reference thereto. It is to be understood, however, that it also finds application in other usage scenarios, and is not necessarily limited to the aforementioned application.

In nuclear medicine imaging scanners, e.g. positron emission tomography (PET) scanners, typically 30% or more detected coincidence events encounter scattering at least once during imaging. Accurate estimation of the amount of scatter is significant in nuclear medicine image reconstruction. Most commercial PET image reconstruction utilizes a single-scatter simulation (SSS) method to estimate the scatter contribution. The method is accurate when majority of scattered events are of single scattering. However, when a patient is larger, multiple scattering may contribute to large portion of all the scattered events. Therefore, SSS is no longer accurate. However, it has been shown through Monte Carlo simulations that the overall shape of scatter contribution does not change significantly with the addition of multiple scatters. Therefore, the SSS should be scaled to compensate for the contribution from multiple scattering.

In PET image reconstruction, a typical method to estimate the scaling factor for SSS is fitting the "tail" part of a SSS sinogram to the measured sinogram, where tail refers to the portion in the sinogram corresponding to the outside of the imaged object. In the method, it is assumed that the tail part in the measured data includes only contributions from scattered events. This assumption is valid for smaller patients when the tail is available and includes enough counts in it. However, when scanning a larger patient, the tail part decreases in size or disappears (truncated). In the case of the tail part being a smaller size or disappearing, fitting the tail can have significant error. As seen in FIG. 1, the resulting image 2 typically suffers from scatter over-subtraction near high concentration areas 4 for a large patient.

Another approach for accurate scatter estimation is to perform a full Monte Carlo simulation to produce shapes of both primary and scatter contributions. It demands significant amount of computations and therefore is too slow for a commercial nuclear medicine imaging system.

The present application provides new and improved methods and systems which overcome the above-referenced problems and others.

In accordance with one aspect, an image processing apparatus is provided. The image processing apparatus a scatter simulation processor which processes measured sinograms generated from imaging data acquired for an imaging subject by an imaging apparatus to produce a scatter sinogram that represents a shape of scatter contribution. A scatter scaling processor utilizes a Monte Carlo simulation to determine a scatter fraction and scales the scatter sinogram to generate a scaled scatter sinogram that matches the scatter contribution in the measured sinogram. A reconstruction processor reconstructs the imaging data into an image representation using the scaled scatter sinogram for scatter correction.

In accordance with another aspect, a method of image processing is provided. The method of image processing including processing measured sinograms generated from imaging data acquired for an imaging subject by an imaging apparatus, producing a scatter sinogram that represents a shape of scatter contribution, determining a scatter fraction and scaling the scatter sinogram to generate a scaled scatter sinogram that matches the scatter contribution in the measured sinogram, and reconstructing the imaging data into an image representation using the scaled scatter sinogram for scatter correction.

In accordance with another aspect, a method of image processing is provided. The method of image processing including with a PET scanner, generating a plurality of events, utilizing SSS and a short Monte Carlo simulation to determine the probability for a detected event pair having encountered scattering, and reconstructing the plurality of generated events into an image representation.

One advantage resides in more accurate estimation of scatter contribution in nuclear medicine scanners.

Another advantage resides in quicker estimation of scatter in nuclear medicine scanners.

Another advantage resides in improved image quality and quantitative accuracy for nuclear medicine scanners.

Another advantage resides in scatter contribution estimation utilizing short Monte Carlo simulations.

Another advantage resides in eliminating tail fitting in scatter contribution estimation.

Another advantage resides in quicker image reconstruction.

Another advantage resides in improved subject throughput.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
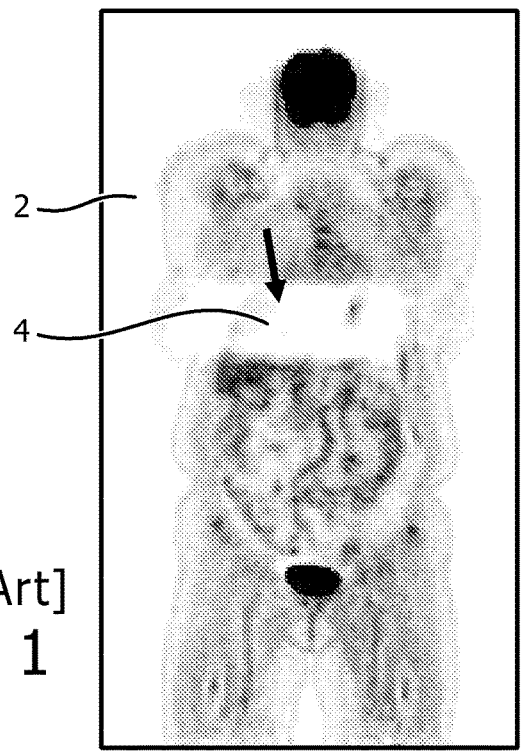
FIG. 1 is an exemplary prior art PET image reconstruction with SSS scatter estimation utilizing tail fitting.
Figure 2:
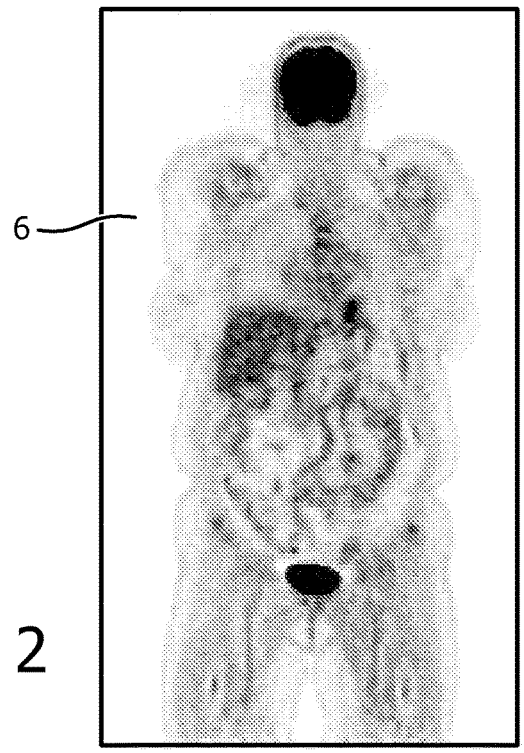
FIG. 2 is an exemplary PET image reconstruction with SSS scatter estimation utilizing Monte Carlo simulation scaling in accordance with the present application.

The present invention utilizes Monte Carlo simulations to quickly derive the ratio among primary and scattered photon pairs in measured PET data for each specific patient. The Monte Carlo simulation is based on the source distribution and attenuation map. The derived ratio is used to scale the sinogram generated from the single-scatter simulation (SSS) so that the scaled sinogram closely approximates the total scatter in the measured sinogram. As seen in FIG. 2, the resulting image 6 reconstructed using SSS with scaling factor derived from a short Monte Carlo simulation eliminates the scanner over-subtraction problem seen in FIG. 1. Additionally, since only the ratio is needed, there is no need to simulate large amount of events in the Monte Carlo simulation, and therefore the additional computation time needed is limited. In this way, more accurate scatter correction in PET reconstruction is performed for all different sizes of imaged object without a significant increase in computation time.

Figure 3:
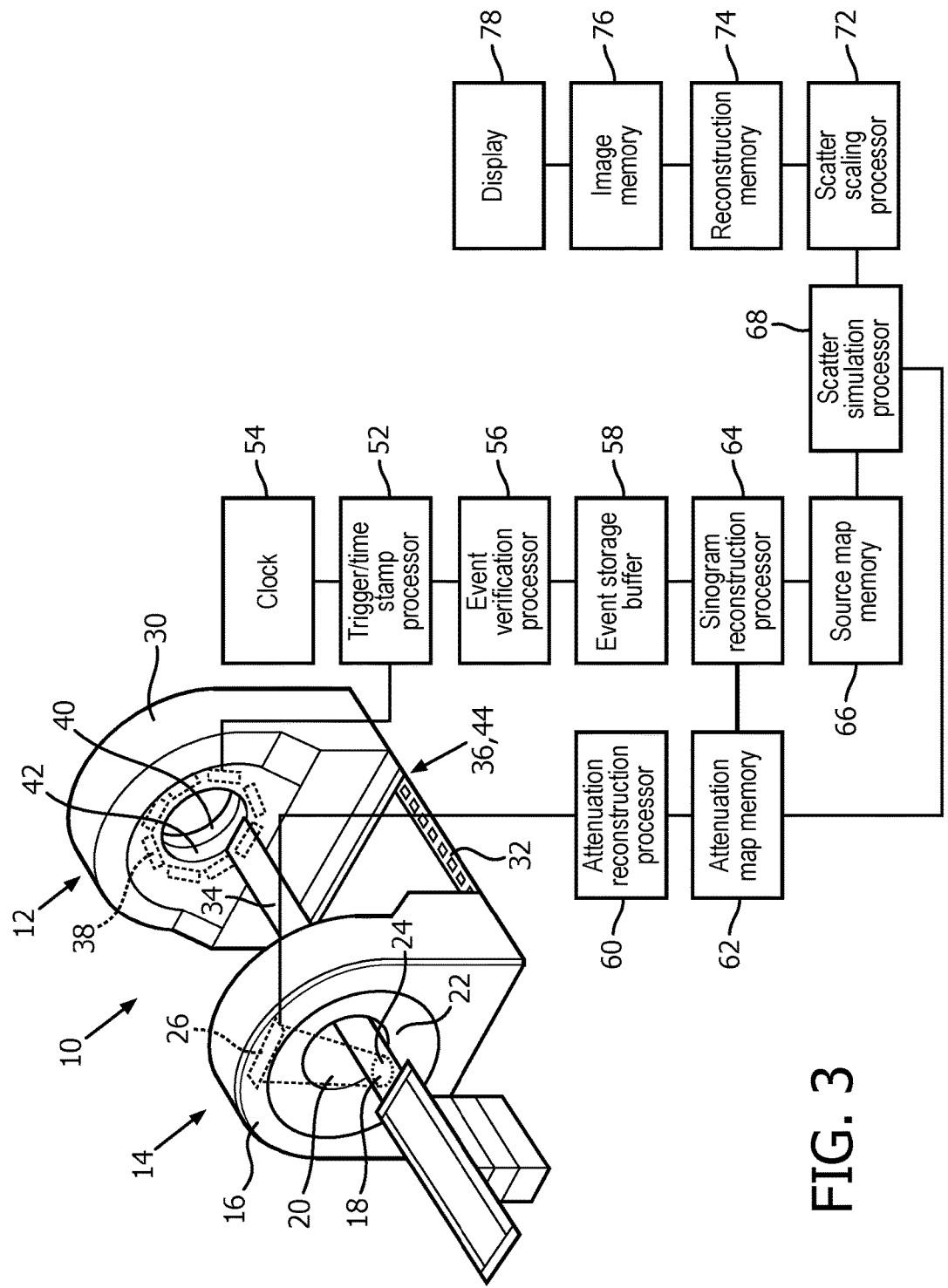
FIG. 3 is a diagrammatic illustration of an imaging system in accordance with the present application.

With reference to FIG. 3, a multi-modality system 10 includes a first imaging system, e.g. a functional modality, preferably, a nuclear imaging system 12, and a second imaging system, e.g. an anatomical modality, such as a computed tomography (CT) scanner 14. The CT scanner 14 includes a non-rotating gantry 16. An x-ray tube 18 is mounted to a rotating gantry 20. A bore 22 defines an examination region 24 of the CT scanner 14. An array of radiation detectors 26 is disposed on the rotating gantry 20 to receive radiation from the x-ray tube 18 after the x-rays transverse the examination region 24. Alternatively, the array of detectors 26 may be positioned on the non-rotating gantry 16. Of course, magnetic resonance and other imaging modalities are also contemplated.

The functional or nuclear imaging system 12, in the illustrated embodiment, includes a positron emission tomography (PET) scanner 30 which may mounted on tracks 32 to facilitate patient access. Of course, SPECT, CT, nuclear medicine imaging, function magnetic resonance imaging (fMRI), and other imaging modalities are also contemplated. The tracks 32 extend in parallel to a longitudinal axis of a subject support or couch 34, thus enabling the CT scanner 14 and PET scanner 12 to form a closed system. A motor and drive 36, is provided to move the PET scanner 12 in and out of the closed position. Detectors 38 are arranged around a bore 40 which defines an examination region 42. In the illustrated PET system, the detectors 38 are arranged in a stationery ring, although rotatable heads are also contemplated. In the SPECT system, the detectors 38 are typically incorporated into individual heads, which are mounted for rotational and radial movement relative to the patient. A motor and drive 44 or the like, provides a longitudinal movement and vertical adjustment of the subject support 34 in the examination regions 24, 42. Mounted CT and PET systems in a single, shared close system with a common examination region is also contemplated.

With continued reference to FIG. 3, the subject support 34, which carries a subject, is moved into the examination region 24 of the CT scanner 14. The CT scanner 14 generates radiation attenuated data which is then used by an attenuation reconstruction processor 60 to reconstruct the radiation attenuated data into an attenuation map that is stored in an attenuation map memory 62.

The patient support 34 moves the subject into the PET scanner 12 in a position that is geometrically and mechanically predicated as being the same as the imaged position in the CT imaging region 24. Before the PET scan commences, a subject is injected with a radiopharmaceutical. In PET scanning, a pair of gamma rays is produced by a positron annihilation event in the examination region 42 and travel in opposite directions. When the gamma ray strikes the detectors 38, the location of the struck detector element and the strike time are recorded. A triggering processor 52 monitors each detector 38 for an energy spike, e.g., integrated area under the pulse, characteristic of the energy of the gamma rays generated by the radiopharmaceutical. From the energy or integrated area, each event is identified as an unscattered or scattered event. The triggering processor 52 checks a clock 54 and time stamps each detected gamma ray with a time of leading edge receipt stamp. In PET imaging, the time stamp, energy estimate and detector position estimation are first used by an event verification processor 56 to determine whether there is a coincident event. Accepted pairs of coincident events define lines of response (LORs). Once an event pair is verified by the event verification processor 56, the LOR is passed to an event storage buffer 58 with their time stamps and stored in a list in the event storage buffer 58 as event data, i.e. as list-mode data.

A sinogram reconstruction processor 64 reconstructs the verified pairs into an image representation of the subject. In one embodiment, the sinogram reconstruction processor 64 converts the verified pairs into sinograms and accesses the attenuation data stored in the attenuation map memory 62 and reconstructs the sinograms into attenuation corrected source distribution map. The attenuation corrected source distribution map is stored in a source map memory 66. It is also contemplated that other reconstruction algorithms may be used including algorithms operating directly with the list-mode data such as list-mode ordered subsets expectation maximization (OSEM), and list-mode reconstruction with time-of-flight (TOF) reconstruction, etc.

A scatter simulation processor 68 utilizes the determined source distribution map and the attenuation map to generate the shape of the scatter sinogram. A scatter scaling processor 72 also utilizes the determined source distribution map and the attenuation map to generate a ratio of scatter contribution with a short Monte Carlo simulation. In one embodiment, the Monte Carlo simulation is performed until the calculated ratio stabilizes. Once the ratio is stable, the Monte Carlo simulation can be terminated to reduce processing time. The SSS sinogram is scaled to define a scaled scatter sinogram. A reconstruction processor 74 utilizes scaled scatter sinogram and reconstructs the event pairs into a final reconstructed image with attenuation and scatter correction. The final reconstructed image is stored in an image memory 76 and displayed for a user on a display device 78, printed, saved for later use, and the like.

Specifically, the measured event data (after random correction) includes primary and scattered coincidence events. The single-scatter simulation (SSS) in scatter simulation processor 68 models single scattering from a given source distribution and the corresponding attenuation map. The scatter scaling processor 72 determines a scale factor with Monte Carlo simulation using the source distribution and the corresponding attenuation map. In the Monte Carlo simulation plurality of photon pairs are generated according to the source distribution. The trajectory of each photon in the attenuation map is traced until the photon escapes from the imaged object. The escaped photon may hit a detector and therefore is detected. A coincidence event is registered if both photons from a positron annihilation are detected. The event is labeled as primary if neither of the photons encountered scattering. The event is labeled as scattered if one or both of the photons have encountered one or more Compton scatterings in the attenuation medium. The ratio of total detected scattered events and total detected events represents the scatter fraction. The scatter fraction changes with number of positron annihilations and eventually stabilizes to a certain value $r_{sc}$. The scatter fraction obtained from the Monte Carlo simulation is a good approximation of the actual scatter fraction in the measured coincidence events. A scaling factor for SSS sinogram is then obtained by the following formula:

$$k = r_{sc} * T_{measured} / T_{SSS} \qquad (1),$$

where $T_{measured}$ is the total counts in the measured sinogram and $T_{SSS}$ is the total counts in the SSS sinogram. The SSS sinogram is scaled by k to produce an estimated scatter sinogram. The reconstruction processor 74 utilizes the scaled SSS sinogram and reconstructs the final reconstructed image.

Figure 4:
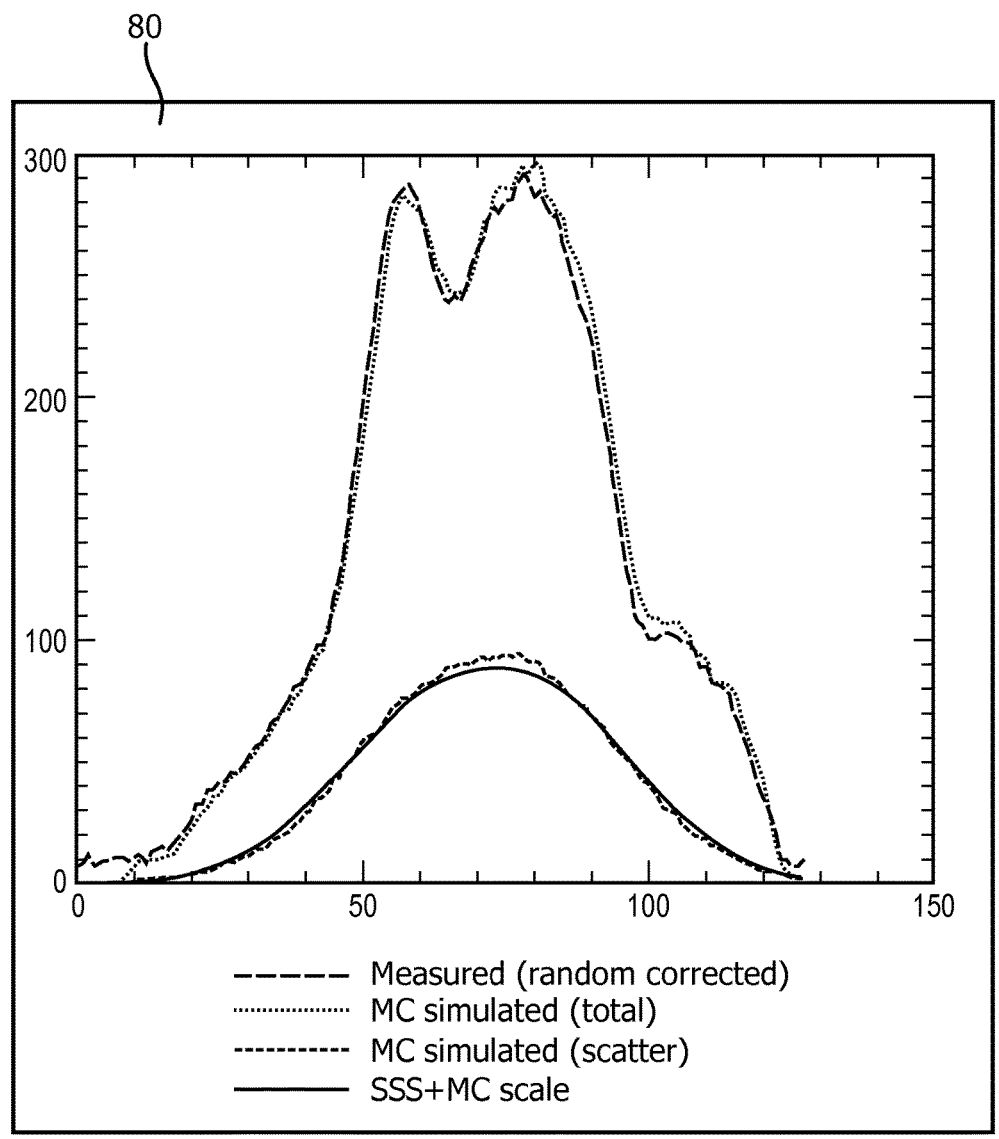
FIG. 4 is a diagrammatic illustration of the comparison of profiles from measures and simulated data in accordance with the present application.

Illustrated in FIG. 4 are the line profiles 80 from the sinograms obtained from the measured data (after random correction), Monte Carlo simulated data, Monte Carlo simulated scattering data, and SSS scattering data after scaled using the scaling factor described above. As shown, (1) the Monte Carlo simulation result matches the measured data and (2) the SSS simulation matches with the total scatter derived from Monte Carlo simulation.

The triggering processor 52, event verification processor 56, attenuation reconstruction processor 60, sinogram reconstruction processor 64, scatter simulation processor 68, and scatter scaling processor 72 include a processor, for example a microprocessor or other software controlled device configured to execute software for performing the operations described above. Typically, the software is carried on tangible memory or a computer readable medium for execution by the processor. Types of computer readable media include memory such as a hard disk drive, CD-ROM, DVD-ROM and the like. Other implementations of the processor are also contemplated. Display controllers, Application Specific Integrated Circuits (ASICs), FPGAs, and microcontrollers are illustrative examples of other types of component which may be implemented to provide functions of the processor. Embodiments may be implemented using software for execution by a processor, hardware, or some combination thereof.

Figure 5:
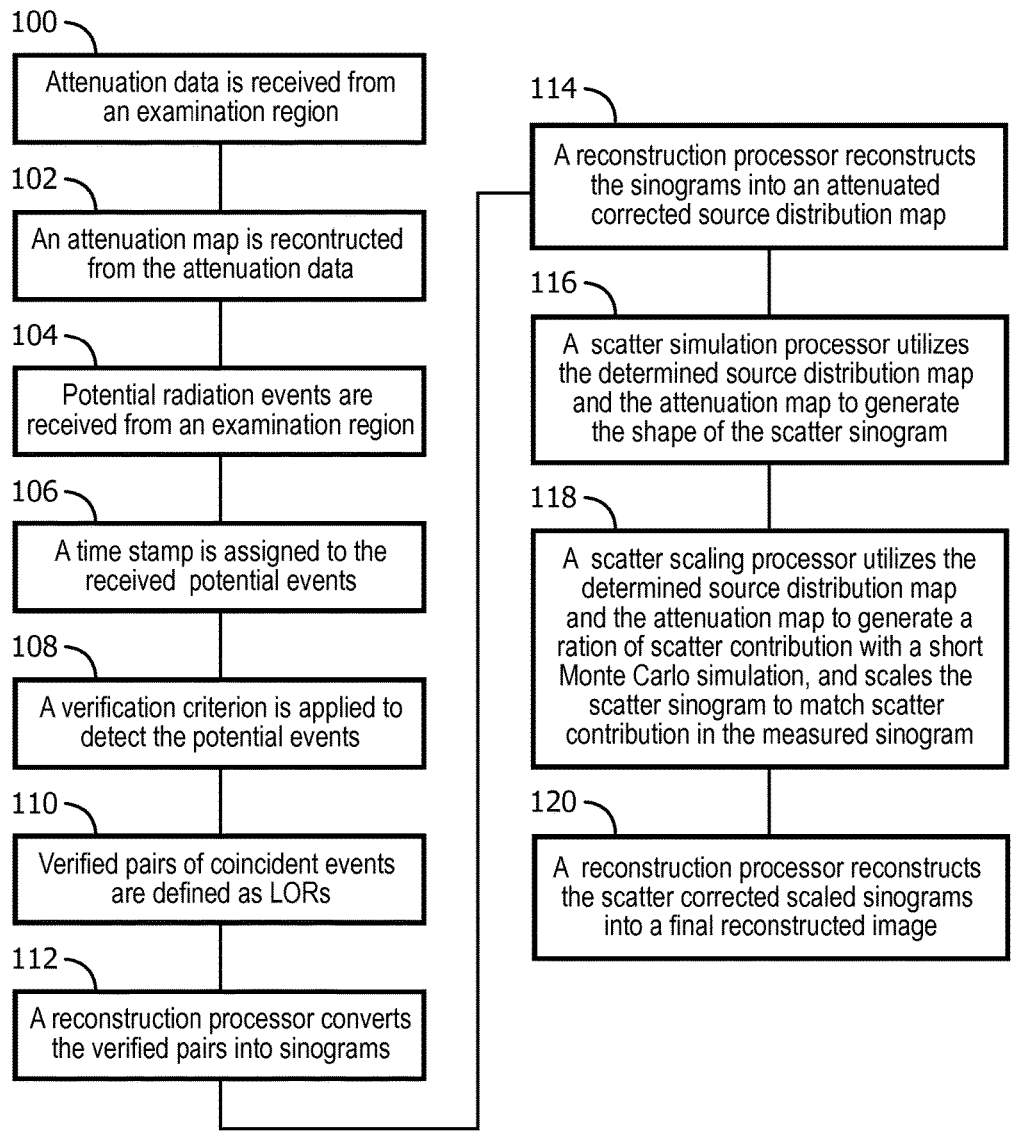
FIG. 5 is a flowchart illustration of a method of image processing in accordance with the present application.

FIG. 5 illustrates a method of image processing. In a step 100, attenuation data is received from an examination region. An attenuation map is reconstructed from the received attenuation data in a step 102. In a step 104, potential radiation events are received from an examination region. A time stamp is assigned to the received events in a step 106. In a step 108, a verification criterion is applied to detect the coincident events. In a step 110, verified pairs of coincident events are defined as LORs. In a step 112, a reconstruction processor converts the verified pairs into sinograms. In a step 114, a reconstruction processor reconstructs the sinograms into an attenuation corrected source distribution map. A scatter simulation processor utilizes the determined source distribution map and the attenuation map to generate the shape of the scatter sinogram in a step 116. In a step 118, a scatter scaling processor utilizes the determined source distribution map and the attenuation map to generate a ratio of scatter contribution with a short Monte Carlo simulation, and scales the scatter sinogram to match scatter contribution in the measured sinogram. In a step 120 a reconstruction processor reconstructs a final reconstructed image utilizing the scaled scatter sinogram and the measured coincidence events or sinograms.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. An image processing apparatus comprising:
   a scatter simulation processor configured to use single-scatter simulation, SSS, for processing measured sinograms generated from imaging data acquired for an imaging subject by an imaging apparatus to produce a single-scatter scatter sinogram that represents a shape of scatter contribution;
   a scatter scaling processor configured to utilize a short Monte Carlo simulation to determine a scatter fraction based on a ratio of a total number of scattered event pairs to a total number of event pairs in a Monte Carlo simulated sinogram and to scale the single-scatter scatter sinogram to generate a scaled scatter sinogram that matches the scatter contribution in the measured sinogram; and
   a reconstruction processor configured to reconstruct the imaging data into an image representation using the scaled scatter sinogram for scatter correction.

2. The image processing apparatus of claim 1, wherein the scatter scaling processor is configured to stop the Monte Carlo simulation in response to the ratio stabilizing.

3. The image processing apparatus of claim 1 wherein one of:
   the imaging apparatus is a positron emission tomography (PET) scanner and the imaging data acquired from the imaging subject by the PET scanner are coincidence event pairs;
   the imaging apparatus is gamma camera and the imaging data acquired from the imaging subject by the gamma camera are single photon emission computed tomography (SPECT) data; and
   the imaging apparatus is transmission computed tomography (CT) scanner and the imaging data acquired from the imaging subject by the CT scanner are CT data.

4. The image processing apparatus according to claim 1, further including:
   a sinogram reconstruction processor configured to convert the coincident event pairs of a subject generated by an imaging apparatus to sinograms.

5. The image processing apparatus according to claim 4, wherein the sinogram reconstruction processor is configured to generate a source distribution map from the sinograms.

6. The image processing apparatus according to claim 1, wherein the Monte Carlo simulation determines a contribution to each sinogram from primary event pairs, single scatter event pairs, and multiple scatter event pairs.

7. The image processing apparatus according to claim 6, wherein the short Monte Carlo simulation is performed until the ratio of the total number of scattered event pairs to the total number of events in each sinogram stabilizes.

8. The image processing apparatus according to claim 1, wherein a determined source distribution and an attenuation map are used in the Monte Carlo simulation.

9. The image processing apparatus according to claim 1, further including an attenuation correction reconstruction processor configured to generate an attenuation map of the subject from radiation attenuation data.

10. The image processing apparatus according to claim 1, wherein the reconstruction processor is configured to operate on list-mode data.

11. The image processing apparatus according to claim 1, wherein the reconstruction processor is configured to operate on the measured sinograms.

12. A method of image processing comprising:
   using single-scatter simulation (SSS) for processing measured sinograms generated from imaging data acquired for an imaging subject by an imaging apparatus to produce a scatter sinogram that represents a shape of a scatter contribution in the measured sinograms;

using a Monte Carlo simulation to determine a scatter fraction based on a ratio of a total number of scattered event pairs to a total number of event pairs in a simulated sinogram and to scale the scatter sinogram to generate a scaled scatter sinogram that matches the shape of the scatter contribution; and reconstructing the imaging data into an image representation using the scaled scatter sinogram for scatter correction.

13. The method according to claim 12, wherein the imaging apparatus is a positron emission tomography (PET) scanner and the imaging data acquired from the imaging subject by the PET scanner are coincidence event pairs.

14. The method according to claim 12, further including:
generating the plurality of coincident event pairs of a subject generated by the imaging apparatus to be reconstructed; and
converting the coincident event pairs to the measured sinograms.

15. The method of image processing according to claim 12, wherein the Monte Carlo simulation determines a contribution to each measured sinogram attributable to scattered event pairs.

16. The method of image processing according to claim 12, wherein a determined source distribution and an attenuation map of the subject are used in the Monte Carlo simulation.

17. The method of image processing according to claim 12, further including:
generating a source distribution map from the sinograms.

18. The method of image processing according to claim 12, further including:
generating the attenuation map from radiation attenuation data.

19. The method of image processing according to claim 12, wherein the Monte Carlo simulation is performed until the ratio stabilizes.

20. A non-transitory computer readable medium which carries a computer program which controls one or more processors to perform the method of claim 12.

21. An image processing apparatus comprising one or more computer processors programmed to:
receive coincident event pairs;
generate measured sinograms from the coincident event pairs;
generate a single-scatter sinogram based on the coincident event pairs, the single-scatter sinogram representing a shape of a scatter contribution;
performing a Monte Carlo simulation to generate a simulated sinogram which simulates both single-scatter and multiple-scatter events in the received coincident events;
calculate a ratio of scattered events, including single-scatter and multiple-scatter events to a total number of coincident events used in the Monte Carlo simulation to generate the simulated sinogram;
stopping the Monte Carlo simulation when the ratio stabilizes;
scale the single-scatter sinogram with the ratio to generate a scaled sinogram; and
reconstruct the measured sinograms to generate an image representation using the scaled sinogram to correct scatter.

22. The image processing apparatus according to claim 21, further including:
a display device controlled by the one or more processors to display the reconstructed, scatter-corrected image representation.

23. The image processing apparatus according to claim 22, further including:
a positron emission tomography scanner configured to generate the coincident event pairs.

* * * * *